May 2, 1967 C. F. LANG ETAL 3,316,748
METHOD OF PRODUCING PROPPING AGENT
Original Filed Dec. 1, 1960
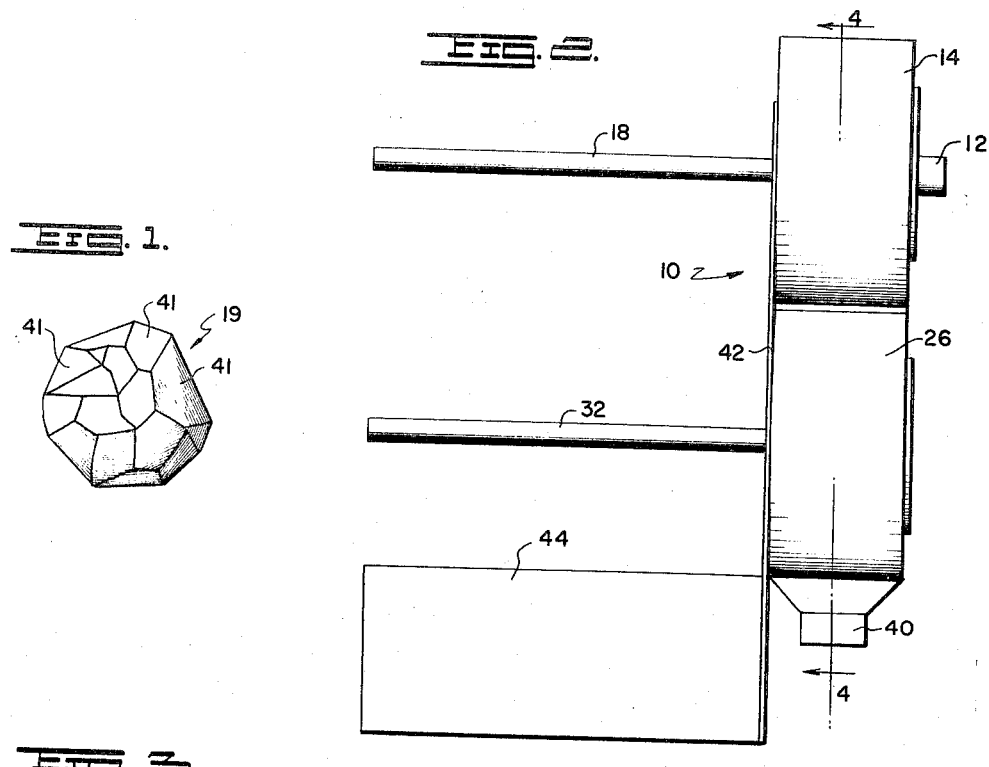
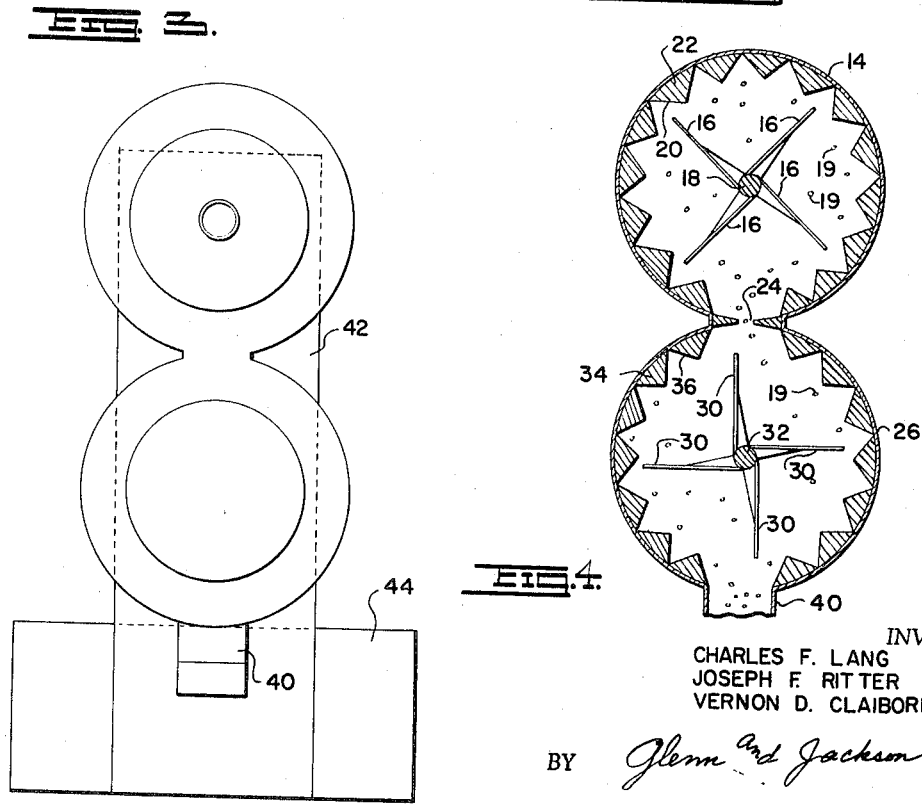
INVENTORS
CHARLES F. LANG
JOSEPH F. RITTER
VERNON D. CLAIBORNE
BY Glenn and Jackson
ATTORNEYS.

United States Patent Office 3,316,748
Patented May 2, 1967

3,316,748
METHOD OF PRODUCING PROPPING AGENT
Charles F. Lang, Henrico County, and Joseph F. Ritter and Vernon D. Claiborne, Chesterfield County, Va., assignors to Reynolds Metals Company, Richmond, Va., a corporation of Delaware
Original application Dec. 1, 1960, Ser. No. 73,098. Divided and this application Oct. 14, 1963, Ser. No. 320,599
7 Claims. (Cl. 72—377)

This application is a division of Ser. No. 73,098, filed Dec. 1, 1960, and now abandoned.

This invention relates to system for increasing the yield of underground formations such as oil wells. More particularly, this invention concerns aluminum particles of appropriate size and strength to be readily injected into underground fractures for holding the fractures open to increase the permeability of the well to fluids, whereby the yield is increased. The invention further provides apparatus and method for producing these aluminum particles.

Others have disclosed the advantages in the use of spheroidal aluminum particles for propping open the fractures in oil wells to increase the permeability of the well and hence the yield from the well. The present invention provides improved aluminum particles for such use, and the means and method of producing them. The aluminum particles of the invention have improved hardness and strength, and appropriate size, so as to be readily injected into the fractures and to sustain the heavy loads produced by the earth formations, thereby maintaining the fractures open.

According to the invention, apparatus is provided for increasing the hardness and strength of cast aluminum particles or shot so as to make the particles appropriate for use as propping agents.

The invention also provides a method for increasing the hardness and strength of the particles by producing repeated dynamic loading on the particles. By a plurality of impacts wherein the particles are impinged upon reaction surfaces, work-hardening and shaping of the particles are produced.

The modified particles are generally spherical in shape and have a plurality of work-hardened facets produced by the impacts. The modified particles have superior strength, corrosion resistance and physical uniformity. Further, the central portion of each particle is preserved in a relatively resilient form, whereby cracking or splitting under compressive loads is resisted.

For a better understanding of the invention and its other objects, advantages and details, reference is now made to the presently preferred embodiments of the invention which are shown for purposes of illustration only, in the accompanying drawings.

In the drawings:

FIGURE 1 is an enlarged semi-diagrammatic view of a modified aluminum particle or pellet according to the invention, having a plurality of work-hardened facets thereon;

FIGURE 2 is a front elevation of apparatus for modifying cast particles to produce the pellets of FIGURE 1;

FIGURE 3 is an end elevation of the apparatus shown in FIGURE 2; and

FIGURE 4 is a vertical section taken along the line 4—4 in FIGURE 2.

The term "aluminum particle," as used herein, means a particle having aluminum as its major component and includes particles formed of pure aluminum and of aluminum alloys.

Initially, aluminum particles are formed as by centrifugal casting, employing a rotating melt of aluminum or aluminum alloy which is centrifugally passed through holes in a perforated tube or pot. The particles are centrifugally hurled either into air or water where they solidify into pellets or particles.

Next, the cast particles are modified employing the apparatus 10 shown in FIGURES 2 to 4 to produce particles as illustrated in FIGURE 1. The cast particles are introduced into axial inlet 12 opening into the upper housing 14 of the modifying apparatus 10. The particles are moved by the action of rotor or fan blades 16 secured to drive shaft 18 rotated by a power source (not shown). The blades 16 hurl the particles 19 against the surfaces 20 of angle members 22 secured to the inner surface of the housing 14. The dynamic loading produced by the contact between the blades 16 and the particles 19 and between the surfaces 20 and the particles 19 produces a work hardening of the metal and converts the shape of the particles to generally spherical.

The particles 19 gradually pass or trickle through the throat 24 connecting the interior of the upper housing 14 with the interior of lower housing 26. This lower housing is provided with rotor or fan blades 30 fast to drive shaft 32 driven by a power source (not shown). Angle members 34 are secured to the inner surface of housing 26 to provide reaction surfaces 36 for impingement by the aluminum particles. The reaction surfaces 20 and 36 extend obliquely to the radii of the housings so as to be substantially perpendicular to the path of particles 19 impelled by the blades. Further work hardening and rounding of the particles is produced by the dynamic loading on the particles 19 occurring within housing 26. The modified particles leave by the tapered discharge outlet 40 and have the general appearance of that shown in FIGURE 1.

The housings 14 and 26 are connected to a plate 42 fixed to a base 44. Each modified particle 19 has a plurality of substantially flat, work-hardened facets 41.

Whenever the provided adjustability of throat 24 is not sufficient to yield an adequate retention time in the modifying apparatus, the particles may be recycled. However, a more efficient production system is achieved by use of a plurality of devices 10, connected in tandem. In such an arrangement, the output of one apparatus 10 is connected to the inlet of another similar apparatus, in order to achieve the desired total retention time.

The modification of the particles by dynamic loading or impact loading produces a general uniformity of the size of the particles. This has been found to be important in the use of the particles as propping agents in oil wells. The uniformity of the size becomes important when the particles are distributed in generally a single layer across the area of a fracture in the earth. When the particles are of substantially the same size, they tend to each bear a portion of the load so that the load is distributed among the various particles and not concentrated on a few of the particles.

Following are examples of the operation of the apparatus 10 of the invention in modifying various samples of aluminum particles. The conditions of operation have been tabulated. The analysis of the particle sizes and distribution of sizes of the particles is tabulated, according to sieve screen sizes, both before and after modification by apparatus 10. The fractions of the particle mixtures are indicated by mesh sizes employing the minus and plus signs. The minus sign indicates the limiting screen, which is the screen through which all the particles of the fraction pass. The plus sign indicates the retaining screen, which is the screen on which all the particles are retained.

In the examples, under mesh size, the percents by weight of each fraction or portion of the particle mixture are listed for sieve size limits. Thus, in Example I, opposite pass 1, +8=75% means that 75% by weight of the sample is retained on a sieve of mesh size 8. Further, −8+10=21.0% means that 21.0% by weight of this sample of particles passes through a sieve or screen of mesh size 8 and is retained on a sieve of mesh size 10.

The testing sieves or screens employed are of the U.S. Sieve Series, U.S. Bureau of Standards, Standard Screen Series of 1919, wherein mesh sizes correspond to apertures as follows. The aperture is the minimum clear distance between the edges of the opening in the screening surface:

| Mesh number: | Aperture in inches |
|---|---|
| 6 | 0.132 |
| 8 | 0.0937 |
| 10 | 0.0787 |
| 12 | 0.0661 |
| 16 | 0.0469 |
| 20 | 0.0331 |
| 30 | 0.0232 |
| 40 | 0.0155 |
| 50 | 0.0117 |
| 60 | 0.0098 |

In the examples, Discharge Opening Size, Top Unit, is the area of throat 24, as seen in FIGURE 4. Similarly, Discharge Opening Size, Bottom Unit, is the minimum area of outlet 40, as seen in FIGURE 2. Weight of mixture is the weight of aluminum particles in the sample. Processing time is the duration during which the sample remains in modifying apparatus 10. Condition describes the hardness and uniformity of the modified particles. Fan Speed is the speed of drive shafts 18 and 32 and revolutions per minute. Passes indicates each passage of the sample successively through apparatus 10. That is, in Example I, the sample of particles was passed only once through apparatus 10. But in Example III, the sample of particles was passed three times through the apparatus 10.

In Examples I to IX, the particles employed were aluminum alloy designated 1100, containing at least 99.00 percent by weight of aluminum.

| Example | Passes | Initial Analysis | | Modified Analysis | | Discharge Opening Size | Weight of Sample and Processing Time | Condition | Fan Speed, r.p.m. |
|---|---|---|---|---|---|---|---|---|---|
| | | Mesh | Size | Mesh | Size | | | | |
| I | 1 | +8=75.0%<br>−8 +10=21.0<br>−10 +12= 4.0<br>−12= 0.0 | | +8=86.0%<br>−8 +10=13.0<br>−10 +12= 0.5<br>−12 +16= 0.5<br>−16= 0.0 | | ½″ x 9″ top unit<br>1″ x 9″ bottom unit | 49 lb./14½ min.<br>204 lb./hour | Good | 2,000 |
| II | 1 | +8=69.5%<br>−8 +10=25.5<br>−10 +12= 5.0 | | | | 1″ x 9″ top unit<br>1½″ x 9″ bottom unit | 49 lb./7 min.<br>420 lb./hour | Fair | 2,000 |
| | 2 | | | +8=92.5%<br>−8 +10= 7.5 | | 1″ x 9″ top unit<br>1½″ x 9″ bottom unit | 48 lb./7 min.<br>410 lb./hour | Good | 2,000 |
| III | 1 | +8=77.0%<br>−8 +10=19.0<br>−10 +12= 2.5<br>−12 +16= 1.5 | | | | 1½″ x 9″ top unit<br>2″ x 9″ bottom unit | 49 bl./10 min.<br>294 lb./hour | Poor | 2,000 |
| | 2 | | | +8=95.0%<br>−8 +10= 5.0 | | 1½″ x 9″ top unit<br>2″ x 9″ bottom unit | 48 lb./6 min.<br>480 lb./hour | Fair | 2,000 |
| | 3 | | | +8=96.5<br>−8 +10= 3.5 | | 1½″ x 9″ top unit<br>2″ x 9″ bottom unit | 47 lb./4 min.<br>705 lb./hour | Good | 2,000 |
| IV | 1 | +8= 0.0%<br>−8 +10= 1.5<br>−10 +12=12.5<br>−12 +16=74.0<br>−16 +20=11.5<br>−20 +30= .5<br>−30=0 .0 | | | | ½″ x 9″ top unit<br>1″ x 9″ bottom unit | 49 lb./11½ min.<br>255 lb./hour | Fair | 2,000 |
| | 2 | | | +8= 0.0%<br>−8 +10= 6.0<br>−10 +12=22.5<br>−12 +16=69.0<br>−16 +20= 2.5<br>−20= 0.0 | | ½″ x 9″ top unit<br>1″ x 9″ bottom unit | 48 lb./10½ min.<br>281 lb./hour | Good | 2,000 |
| V | 1 | +8= 0.0%<br>−8 +10=13.5<br>−10 +12=25.0<br>−12 +16=50.5<br>−16 +20=10.5<br>−20 +30= .5<br>−30= 0.0 | | | | 1″ x 9″ top unit<br>1½″ x 9″ bottom unit | 49 lb./6 min.<br>490 lb./hour | Fair | 2,000 |
| | 2 | | | +8= 0.0%<br>−8 +10=13.0<br>−10 +12=30.0<br>−12 +16=54.5<br>−16 +20= 1.5<br>−20 +30= 1.0<br>+8= 0.0 | | 1″ x 9″ top unit<br>1½″ x 9″ bottom unit | 48 lb./6 min.<br>480 lb./hour | Fair | 2,000 |
| | 3 | | | −8 +10=12.0<br>−10 +12=26.0<br>−12 +16=62.0<br>−16= 0.0 | | 1″ x 9″ top unit<br>1½″ x 9″ bottom nuit | 47 lb./13 min.<br>217 lb./hour | Good | 2,000 |

| Example | Passes | Initial Analysis Mesh | Initial Analysis Size | Modified Analysis Mesh | Modified Analysis Size | Discharge Opening Size | Weight of Sample and Processing Time | Condition | Fan Speed, r.p.m. |
|---|---|---|---|---|---|---|---|---|---|
| VI | 1 | +8=<br>−8 +10=<br>−10 +12=<br>−12 +16=<br>−16 +20=<br>−20 +30=<br>−30= | 0.0%<br>11.0<br>24.0<br>54.0<br>10.0<br>1.0<br>0.0 | | | 1½″ x 9″ top unit<br>2″ x 9″ bottom unit | 49 lb./6 min.<br>490 lb./hour | Poor | 2,000 |
| | 2 | | | | | 1½″ x 9″ top unit<br>2″ x 9″ bottom unit | 48 lb./4 min.<br>576 lb./hour | Fair | 2,00 |
| | 3 | | | +8=<br>−8 +10=<br>−10 +12=<br>−12 +16=<br>−16 +20=<br>−20 +30=<br>−30= | 0.0%<br>9.0<br>21.0<br>66.5<br>1.5<br>2.0<br>0.0 | 1½″ x 9″ top unit<br>2″ x 9″ bottom unit | 47 lb./5 min.<br>534 lb./hour | Good | 2,000 |
| VII | 1 | +8=<br>−8 +10=<br>−10 +12=<br>−12 +16=<br>−16 +20=<br>−20 +30=<br>−30= | 0.0%<br>3.5<br>16.5<br>69.5<br>9.5<br>1.0<br>0.0 | | | 1½″ x 9″ top unit<br>2″ x 9″ bottom unit | 49 lb./7 min<br>420 lb./hour | Poor | 1,000 |
| | 2 | | | | | 1½″ x 9″ top unit<br>2″ x 9″ bottom unit | 48 lb./7 min<br>410 lb./hour | Poor | 1,000 |
| | 3 | | | | | 1½″ x 9″ top unit<br>2″ x 9″ bottom unit | 47 lb./8 min<br>353 lb./hour | Poor | 1,000 |
| | 4 | | | +8=<br>−8 +10=<br>−10 +12=<br>−12 +16=<br>−16 +20=<br>−20= | 0.0%<br>.5<br>14.0<br>75.5<br>10.0<br>0.0 | 1½″ x 9″ top unit<br>2″ x 9″ bottom unit | 46 lb./8 min<br>345 lb./hour | Poor | 1,000 |
| | 5 | | | | | 1½″ x 9″ top unit<br>2″ x 9″ bottom unit | 45 lb./8 min.<br>338 lb./hour | Poor | 1,000 |
| | 6 | | | | | 1½″ x 9″ top unit<br>2″ x 9″ bottom unit | 44 lb./7 min.<br>377 lb./hour | Fair | 1,000 |
| | 7 | | | | | 1½″ x 9″ top unit<br>2″ x 9″ bottom unit | 43 lb./8 min.<br>323 lb./hour | Fair | 1,000 |
| | 8 | | | +8=<br>−8 +10=<br>−10 +12=<br>−12 +16=<br>−16 +20=<br>−20= | 0.0<br>12.0<br>19.0<br>63.0<br>6.0<br>0.0 | 1½″ x 9″ top unit<br>2″ x 9″ bottom unit | 42 bl./9 min.<br>280 lb./hour | Good | 1,000 |
| VIII | 1 | +8=<br>−8 +10=<br>−10 +12=<br>−12 +16=<br>−16 +20=<br>−20= | 0.0%<br>6.5<br>18.5<br>66.0<br>9.0<br>0.0 | | | 1½″ x 9″ top unit<br>2″ x 9″ bottom unit | 49 lb./5 min.<br>588 lb./hour | Fair | 3,000 |
| | 2 | | | +8=<br>−8 +10=<br>−10 +12=<br>−12 +16=<br>−16 +20=<br>−20= | 0.0%<br>13.0<br>20.5<br>62.5<br>4.0<br>0.0 | 1½″ x 9″ top unit<br>2″ x 9″ bottom unit | 48 lb./3 min.<br>960 lb./hour | Fair | 3,000 |
| | 3 | | | +8=<br>−8 +10=<br>−10 +12=<br>−12 +16=<br>−16 +20=<br>−20= | 0.0<br>12.5<br>18.5<br>65.0<br>4.0<br>0.0 | 1½″ x 9″ top unit<br>2″ x 9″ bottom unit | 47 lb./3½ min.<br>806 lb./hour | Good | 3,000 |

The following examples relate to modification of aluminum particles of 1100 designation alloy. As cast, the particles are generally acicular or needle-shaped.

| Example | Passes | Initial Analysis Mesh | Initial Analysis Size | Modified Analysis Mesh | Modified Analysis Size | Discharge Opening Size | Weight of Sample and Processing Time | Condition | Fan Speed, r.p.m. |
|---|---|---|---|---|---|---|---|---|---|
| IX | 1 | +8=<br>−8 +12=<br>−12 +16=<br>−16 +20=<br>−20 +30=<br>−30= | 0.0%<br>0.0<br>1.5<br>32.0<br>59.0<br>7.5 | | | ½″ x 9″ top unit<br>1″ x 9″ bottom unit | 49 lb./9 min.<br>326 lb./hour | Poor | 2,000 |
| | 2 | | | | | ½″ x 9″ top unit<br>1″ x 9″ bottom unit | 48 lb./8¼ min.<br>348 lb./hour | Poor | 2,000 |
| | 3 | | | | | ½″ x 9″ top unit<br>1″ x 9″ bottom unit | 47 lb./13¼ min.<br>213 lb./hour | Poor | 2,000 |
| | 4 | | | −8 +12=<br>−12 +16=<br>−16 +20=<br>−20 +30=<br>−30= | 0.0%<br>11.0<br>70.0<br>19.0<br>0.0 | ½″ x 9″ top unit<br>1″ x 9″ bottom unit | 46 lb./11½ min.<br>240 lb./hour | Poor | 2,000 |
| | 5 | | | | | ½″ x 9″ top unit<br>1″ x 9″ bottom unit | 45 lb./11¼ min.<br>240 lb./hour | Fair | 2,000 |
| | 6 | | | | | ½″ x 9″ top unit<br>1″ x 9″ bottom unit | 44 lb./11 min.<br>140 lb./hour | Fair | 2,000 |
| | 7 | | | +8=<br>−8 +12=<br>−12 +16=<br>−16 +20=<br>−20 +30=<br>−30= | 0.0<br>0.0<br>8.0<br>76.0<br>15.5<br>.5 | ½″ x 9″ top unit<br>1″ x 9″ bottom unit | 43 lb./12¼ min.<br>351 lb./hour | Good | 2,000 |

| Example | Passes | Initial Analysis Mesh Size | Modified Analysis Mesh Size | Discharge Opening Size | Weight of Sample and Processing Time | Condition | Fan Speed, r.p.m. |
|---|---|---|---|---|---|---|---|
| X | 1 | −8 +12= 0.0%<br>−12 +16= 2.0<br>−16 +20=38.5<br>−20 +30=53.5<br>−30= 6.0 | | 1″ x 9″ top unit<br>1½″ x 9″ bottom unit | 49 lb./9 min.<br>326 lb./hour | Poor | 2,000 |
| | 2 | | | 1″ x 9″ top unit<br>1½″ x 9″ bottom unit | 48 lb./3 min.<br>960 lb./hour | Poor | 2,000 |
| | 3 | | | 1″ x 9″ top unit<br>1½″ x 9″ bottom unit | 47 lb./7 min.<br>403 lb./hour | Poor | 2,000 |
| | 4 | | | 1″ x 9″ top unit<br>1½″ x 9″ bottom unit | 46 lb./14 min.<br>197 lb./hour | Poor | 2,000 |
| | 5 | | −8 +12= 0.0%<br>−12 +16=10.5<br>−16 +20=68.5<br>−20 +30=21.0<br>−30= 0.0 | 1″ x 9″ top unit<br>1½″ x 9″ bottom unit | 45 lb./14 min.<br>192 lb./hour | Fair | 2,000 |
| | 6 | | | 1″ x 9″ top unit<br>1½″ x 9″ bottom unit | 44 lb./10 min.<br>264 lb./hour | Fair | 2,000 |
| | 7 | | | 1″ x 9″ top unit<br>1½″ x 9″ bottom unit | 43 lb./6 min.<br>430 bl./hour | Fair | 2,000 |
| | 8 | | | 1″ x 9″ top unit<br>1½″ x 9″ bottom unit | 42 lb./3 min.<br>840 lb./hour | Fair-Good | 2,000 |
| | 9 | | −8 +12= 0.0<br>−12 +16= 9.5<br>−16 +20=60.5<br>−20 +30=30.0<br>−30= 0.0 | 1″ x 9″ top unit<br>1½″ x 9″ bottom unit | 41 lb./9 min.<br>273 lb./hour | Good | 2,000 |
| XI | 1 | −8 +16= 0.0%<br>−16 +20=37.0<br>−20 +30=57.0<br>−30= 6.0 | | 1½″ x 9″ top unit<br>2″ x 9″ bottom unit | 49 lb./9 min.<br>326 lb./hour | Poor | 2,000 |
| | 2 | | | 1½″ x 9″ top unit<br>2″ x 9″ bottom unit | 48 lb./6 min.<br>480 lb./hour | Poor | 2,000 |
| | 3 | | | 1½″ x 9″ top unit<br>2″ x 9″ bottom unit | 47 lb./6 min.<br>470 lb./hour | Poor | 2,000 |
| | 4 | | −8 +12= 0.0%<br>−12 +16= 6.0<br>−16 +20=54.5<br>−20 +30=37.5<br>−30= 2.0 | 1½″ x 9″ top unit<br>2″ x 9″ bottom unit | 46 lb./7 min.<br>394 lb./hour | Poor | 2,000 |
| | 5 | | | 1½″ x 9″ top unit<br>2″ x 9″ bottom unit | 45 lb./4 min.<br>675 lb./hour | Poor | 2,000 |
| | 6 | | | 1½″ x 9″ top unit<br>2″ x 9″ bottom unit | 44 lb./6 min.<br>440 lb./hour | Fair | 2,000 |
| | 7 | | | 1½″ x 9″ top unit<br>2″ x 9″ bottom unit | 43 lb./6 min.<br>430 lb./hour | Fair | 2,000 |
| | 8 | | | 1½″ x 9″ top unit<br>2″ x 9″ bottom unit | 42 lb./5 min.<br>504 lb./hour | Fair | 2,000 |
| | 9 | | | 1½″ x 9″ top unit<br>2″ x 9″ bottom unit | 41 lb./5 min.<br>492 lb./hour | Fair-good | 2,000 |
| | 10 | | −8 +12= 0.0<br>−12 +16=12.5<br>−16 +20=71.5<br>−20 +30=10.0<br>−30= 6.0 | 1½″ x 9″ top unit<br>2″ x 9″ bottom unit | 40 lb./6 min.<br>400 lb./hour | Good | 2,000 |

The invention has also been applied to aluminum powder of even greater fineness than the previous examples. After seven passes through the apparatus of the invention, aluminum powder was modified having the following initial and modified screen size distribution:

| Initial Analysis | | Modified Analysis | |
|---|---|---|---|
| Mesh | Size | Mesh | Size |
| +8= | 0.0% | +8= | 0.0% |
| −8 +10= | 0.0 | −8 +12= | 0.0 |
| −10 +12= | .5 | −12 +16= | 13.0 |
| −12 +16= | 10.0 | −16 +20= | 48.0 |
| −16 +20= | 14.5 | −20 +30= | 34.0 |
| −20 +30= | 46.5 | −30= | 5.0 |
| −30= | 28.5 | | |

Further to illustrate the invention, following is a table of microhardness of aluminum particles before and after treatment according to the invention. In the column under "As Cast," are listed the Knoop Hardness Numbers, when measured with a one kilogram load, for the aluminum particles before modification according to the invention. In the column under "Modified," are listed the Knoop Hardness Numbers, when measured with a one kilogram load, of the aluminum particles after modification according to the invention in apparatus 10; it can be seen that these values are at least 40. Under "Alloy" are listed the alloy designations by the 4-digit code of the Aluminum Association:

TABLE

| | Alloy | Knoop Hardness Number | |
|---|---|---|---|
| | | As Cast | Modified |
| 1 | 6061, air cast | 54.71 | 93.07 |
| 2 | 6061, solution heat-treated for 2 hours at 970° F. and aged for 8 hours at 350° F. | 101.7 | 102.8 |
| 3 | 6061, aged for 8 hours at 350° F. | 71.85 | 102.3 |
| 4 | 6063, air cast | 42.01 | 69.96 |
| 5 | 6063, solution heat treated for 2 hours at 670° F. and aged for 8 hours at 350° F. | 81.44 | 89.38 |
| 6 | 6063, aged for 8 hours at 350° F. | 56.02 | 82.22 |
| 7 | 5052, air cast | 53.86 | 79.90 |
| 8 | 3003, water cast | 45.86 | 68.43 |
| 9 | 1100, air cast | 29.46 | 44.57 |
| 10 | 1100 +1% magnesium water cast | 43.49 | 67.54 |
| 11 | 1100 +2% magnesium water cast | 46.19 | 69.65 |
| 12 | 1100 +3% magnesium water cast | 47.73 | 77.68 |
| 13 | 1100 +4% magnesium water cast | 58.78 | 83.02 |
| 14 | 1100 +5% magnesium water cast | 69.03 | 94.03 |

In the preferred mode of using the modified aluminum particles as propping agents in wells, a fluid, such as crude oil, kerosene, acid or water, which can contain an agent to prevent fluid loss into the formation, is pumped into the well bore under a pressure sufficient to fracture the formation of interest or enlarge an existing fracture in such formation. Thereafter, a fluid containing the work-hardened aluminum particles of the present invention is forced into the fracture to deposit the propping agent therein. This second fluid can be an unmodified crude oil or water, as in the first step, if sufficient pumping capacity is available.

The modified aluminum particles used as well propping agents should be larger than about 60 mesh and preferably within the screen size range −5 to +20. That is, the particles preferably should all pass through a number 5 mesh screen and be retained on a number 20 mesh screen.

In order that most of the particles carry loads in the well fracture, the sizes of the particles should be generally uniform. Most preferably, an aluminum particle mixture for use as a well propping agent should have a Limiting Screen and a Retaining Screen with mesh numbers differing by not more than 4. The use of aluminum particle mixtures of −12+16 mesh sizing is recommended. The particular sizing employed will depend upon the nature of the underground formation.

Thus it will be seen that the invention provides method and apparatus for producing aluminum particles having strength, hardness, uniformity of size and corrosion resistance for use as propping agents in underground wells.

For additional details concerning the preparation of cast particles which are especially suitable for use in the present invention, reference is made to application Ser. No. 27,961 filed May 9, 1960, by Leland R. Payton, now Patent No. 2,994,102 and Ser. No. 754,014 filed Aug. 8, 1958 by Vernon D. Claiborne and Leland R. Payton, now abandoned.

While presently preferred embodiments of the invention have been illustrated and described, it will be recognized that the invention can be otherwise variously embodied and practiced within the scope of the following claims.

We claim:

1. A method of faceting, rounding, and work-hardening a cast aluminum particle, said method comprising the steps of: disposing said particle in the path of radially extending rotary blades terminating proximate to a reaction surface whose major portion is spaced from said path by a distance exceeding the width of said particle, striking said particle with a said blade, allowing said particle, as a result of the force of its impact with said blade, to travel freely away from the point of said impact until said particle impinges against said reaction surface, and rebounding said particle off said reaction surface back into said path.

2. The method of claim 1 wherein said particle impacts said reaction surface from a substantially perpendicular direction.

3. A method of producing a work-hardened, substantially rounded, faceted aluminum particle suitable for propping a fracture in a sub-surface earth formation, said method comprising the steps of: rotating a rotor disposed within a reaction zone defined by a closed reaction surface, said rotor having radially extending blades with side surfaces and with ends terminating proximate to said reaction surface; introducing an aluminum particle in the as-cast condition to said reaction zone in the path of said blade side surface; and, repeatedly, striking said particle with a said blade side surface, allowing said particle, as a result of the force of its impact with said blade side surface, to travel freely away from the point of said impact until said particle impinges against said reaction surface, and rebounding said particle from said reaction surface freely back into the path of a said blade side surface; so that the repeated impacts between said blade side surface and said particle and between said particle and said reaction surface facets and work-hardens the exterior portion of said particle.

4. The method of claim 3 wherein said work-hardened particle has a Knoop hardness number of at least 40 when measured with a one kilogram load.

5. A method of producing an aluminum particle suitable for propping a fracture in a sub-surface earth formation, said method comprising the steps of: providing an aluminum particle in the as-cast condition, disposing said particle in the path of radially extending rotary blades with side surfaces and with ends terminating proximate to a reaction surface, striking said particle with a said blade side surface, impelling said particle freely away from said blade side surface, and rebounding said particle off said reaction surface and back into said path, thereby deforming and work-hardening only the exterior portion of said particle and preserving the central portion of said particle in relatively resilient form.

6. The method of claim 5 wherein repeated impacts of said particle with said blade side surfaces and with said reaction surface facets, rounds, and work-hardens said particle.

7. The method of claim 5 wherein said particle is impelled substantially perpendicularly against said reaction surface.

References Cited by the Examiner

UNITED STATES PATENTS

| | | | |
|---|---|---|---|
| 406,136 | 7/1889 | Hempel | 241—43 |
| 996,573 | 6/1911 | Eveland | 78—1 |
| 2,758,360 | 8/1956 | Shetler | 29—1.22 |
| 2,816,466 | 12/1957 | Gladfelter | 78—1 |
| 2,946,115 | 3/1960 | Firm | 29—184.4 |
| 2,963,772 | 12/1960 | Niles | 29—148.4 |
| 3,150,838 | 9/1964 | Adams | 211—275 |

FOREIGN PATENTS 592,414   8/1925   France.

CHARLES W. LANHAM, *Primary Examiner.*

G. P. CROSBY, *Examiner.*